US012489471B2

(12) United States Patent
Raghavan (10) Patent No.: US 12,489,471 B2
(45) Date of Patent: Dec. 2, 2025

(54) DIPLEXER/MULTIPLEXER FOR CARRIER AGGREGATION

(71) Applicant: Skyworks Solutions, Inc., Irvine, CA (US)

(72) Inventor: Anand Raghavan, Middleton, WI (US)

(73) Assignee: Skyworks Solutions, Inc., Irvine, CA (US)

( * ) Notice: Subject to any disclaimer, the term of this patent is extended or adjusted under 35 U.S.C. 154(b) by 529 days.

(21) Appl. No.: 18/146,226

(22) Filed: Dec. 23, 2022

(65) Prior Publication Data

US 2023/0216527 A1 Jul. 6, 2023

Related U.S. Application Data

(60) Provisional application No. 63/266,242, filed on Dec. 30, 2021.

(51) Int. Cl.
  *H04B 1/00* (2006.01)
(52) U.S. Cl.
  CPC .................................. *H04B 1/0057* (2013.01)
(58) Field of Classification Search
  CPC .................................................... H04B 1/0057
  See application file for complete search history.

(56) References Cited

U.S. PATENT DOCUMENTS

| 10,637,412 | B2 | 4/2020 | Ye et al. |
| 10,840,958 | B2 | 11/2020 | Raghavan |
| 10,855,325 | B2 | 12/2020 | Raghavan |
| 11,601,144 | B2 | 3/2023 | Loh et al. |
| 11,736,132 | B2 | 8/2023 | Raghavan |
| 11,736,140 | B2 | 8/2023 | Pehlke et al. |
| 11,742,890 | B2 | 8/2023 | Raghavan et al. |
| 2020/0067606 | A1 | 2/2020 | Raghavan |
| 2021/0098897 | A1 | 4/2021 | Pehlke et al. |
| 2021/0235429 | A1* | 7/2021 | Hareuveni .......... H04W 72/044 |
| 2022/0069850 | A1 | 3/2022 | Loh et al. |
| 2022/0182084 | A1 | 6/2022 | King et al. |
| 2022/0239430 | A1 | 7/2022 | Jayaraman et al. |
| 2023/0088469 | A1 | 3/2023 | Raghavan |
| 2023/0107261 | A1 | 4/2023 | Raghavan |
| 2023/0155622 | A1 | 5/2023 | Raghavan et al. |

* cited by examiner

*Primary Examiner* — Natasha W Cosme
(74) *Attorney, Agent, or Firm* — Knobbe, Martens, Olson & Bear, LLP (57) ABSTRACT

Diplexers and multiplexers for carrier aggregation are disclosed. In one aspect, a front end for receiving carrier aggregation radio frequency signals includes an antenna switch module configured to receive a first radio frequency signal in a first band and a second radio frequency signal in a second band from an antenna, and a diplexer including a first filter configured to pass the first band, a second filter configured to pass the second band, and a diplexed node between the first and second filters and coupled to the antenna switch module. The front end can further include a main amplifier coupled to the diplexed node of the diplexer and configured to amplify radio frequency signals received from the diplexer, and a transconductance stage coupled to the main amplifier and configured to independently control the gain of the main amplifier for the first band and the second band.

20 Claims, 9 Drawing Sheets

DIPLEXER/MULTIPLEXER FOR CARRIER AGGREGATION

CROSS-REFERENCE TO RELATED APPLICATION(S)

This application claims the benefit of U.S. Provisional Application No. 63/266,242, filed Dec. 30, 2021, which is hereby incorporated by reference in its entirety.

BACKGROUND

Field

Embodiments of this disclosure relate to diplexers that can be used in radio frequency (RF) front end modules (FEMs).

Description of the Related Technology

With 5G development, carrier aggregation (CA) is being implemented in radio frequency (RF) modules. To support carrier aggregation, different receive paths may be implemented to amplify RF signals in each supported band. It can be costly to implement these parallel paths as the number of bands supported by carrier aggregation increases. It is desirable to provide a lower size/cost implementation which can support multi-band carrier aggregation.

SUMMARY

The innovations described in the claims each have several aspects, no single one of which is solely responsible for its desirable attributes. Without limiting the scope of the claims, some prominent features of this disclosure will now be briefly described.

One aspect of this disclosure is a front end for receiving carrier aggregation radio frequency signals, the front end comprising: an antenna switch module configured to receive a first radio frequency signal in a first band and a second radio frequency signal in a second band from an antenna; a diplexer including a first filter configured to pass the first band, a second filter configured to pass the second band, and a diplexed node between the first and second filters and coupled to the antenna switch module; a main amplifier coupled to the diplexed node of the diplexer and configured to amplify radio frequency signals received from the diplexer; and a transconductance stage coupled to the main amplifier and configured to independently control the gain of the main amplifier for the first band and the second band.

In some embodiments, the transconductance stage includes a first common-gate stage configured to control the gain of the main amplifier for the first band and a second common-gate stage configured to control the gain of the main amplifier for the second band.

In some embodiments, the transconductance stage includes a first common-gate stage and a second common-gate stage, the first common-gate stage and the main amplifier together forming a first cascode, and the second common-gate stage and the main amplifier together forming a second cascode.

In some embodiments, the first common-gate stage includes a plurality of parallel devices configured to adjust an effective size of the first cascode.

In some embodiments, each of the parallel device comprises a transistor.

In some embodiments, the first common-gate stage includes a plurality of parallel devices coupled to the main amplifier, and an inductor and an attenuator arrange in parallel between a power high supply voltage and the parallel devices.

In some embodiments, the transconductance stage together with the main amplifier form a first cascode and a second cascode, the first cascode configured to modify an active gain of the first band independently of an active gain of the second band.

In some embodiments, the front end further comprises an inductor coupled between the diplexed node of the diplexer and the main amplifier.

In some embodiments, the front end further comprises a first inductor coupled between the diplexed node of the diplexer and the main amplifier and a second inductor coupled between the main amplifier and a power low supply voltage, the first inductor, the main amplifier and the second inductor form a shared path configured to amplify both the first band and the second band.

In some embodiments, the transconductance stage includes a dummy device configured to reduce current applied to the main amplifier.

In some embodiments, the front end further comprises a first bypass amplifier configured to amplify the first band in a bypass mode and a second bypass amplifier configured to amplify the second band in the bypass mode.

In some embodiments, the front end further comprises a first attenuator coupled between the diplexed node of the diplexer and the first bypass amplifier and a second attenuator coupled between the diplexed node of the diplexer and the second bypass amplifier.

Another aspect is a diplexer module for amplifying received radio frequency signals in a first band and a second band, the diplexer module comprising: a diplexer including a first filter configured to pass the first band, a second filter configured to pass the second band, and a diplexed node between the first and second filters; a main amplifier coupled to the diplexed node of the diplexer and configured to amplify radio frequency signals received from the diplexer; and a transconductance stage coupled to the main amplifier and configured to independently control the gain of the main amplifier for the first band and the second band.

In some embodiments, the transconductance stage includes a first common-gate stage configured to control the gain of the main amplifier for the first band and a second common-gate stage configured to control the gain of the main amplifier for the second band.

In some embodiments, the transconductance stage includes a first common-gate stage and a second common-gate stage, the first common-gate stage and the main amplifier together forming a first cascode, and the second common-gate stage and the main amplifier together forming a second cascode.

In some embodiments, the first common-gate stage includes a plurality of parallel devices configured to adjust an effective size of the first cascode.

In some embodiments, each of the parallel device comprises a transistor.

In some embodiments, the first common-gate stage includes a plurality of parallel devices coupled to the main amplifier, and an inductor and an attenuator arrange in parallel between a power high supply voltage and the parallel devices.

In some embodiments, the transconductance stage together with the main amplifier form a first cascode and a second cascade, the first cascade configured to modify an active gain of the first band independently of an active gain of the second band.

Yet another aspect is a radio frequency module comprising: a front end including an antenna switch module configured to receive a first radio frequency signal in a first band and a second radio frequency signal in a second band, a diplexer including a first filter configured to pass the first band, a second filter configured to pass the second band, and a diplexed node between the first and second filters and coupled to the antenna switch module, a main amplifier coupled to the diplexed node of the diplexer and configured to amplify radio frequency signals received from the diplexer, and a transconductance stage coupled to the main amplifier and configured to independently control the gain of the main amplifier for the first band and the second band; and an antenna coupled to the antenna switch module, the front end and the antenna being enclosed within a common package.

DETAILED DESCRIPTION

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Proliferation of frequency bands and carrier aggregation combinations in RF front ends (RFFEs) has been driving higher costs to support features. It is desirable to reduce internal multichip module (MCM)/surface mount (SMT) content as well the number of includes active devices, in order to contain costs to meet desired or specified costs.

In certain implementations, filters involved in carrier aggregation band combinations are commonly diplexed/multiplexed. This also typically involves resolving the receive path for each band separately into distinct low noise amplifiers (LNAs). This has traditionally been necessary as the two or more bands in carrier aggregation need to operate independently, with separate and full range of gain control for each band, due to the cellular radio environment in which the bands are deployed.

According to aspects of this disclosure two or more band filters are diplexed/multiplexed, but are recombined to implement a dual-passband filter (1-in/1-out). The resulting receive path includes a single gain-stage, with common matching elements. The output current is generated via separate current-buffers/cascades with separate resonant loads and design that allows independent current/gain control in each band path. Single-band operation is largely unchanged compared to other implementations, except for some parasitic loading due to the inclusion of additional active devices.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IoT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

Example Communication Networks and Wireless Communication Devices

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

Figure 1:
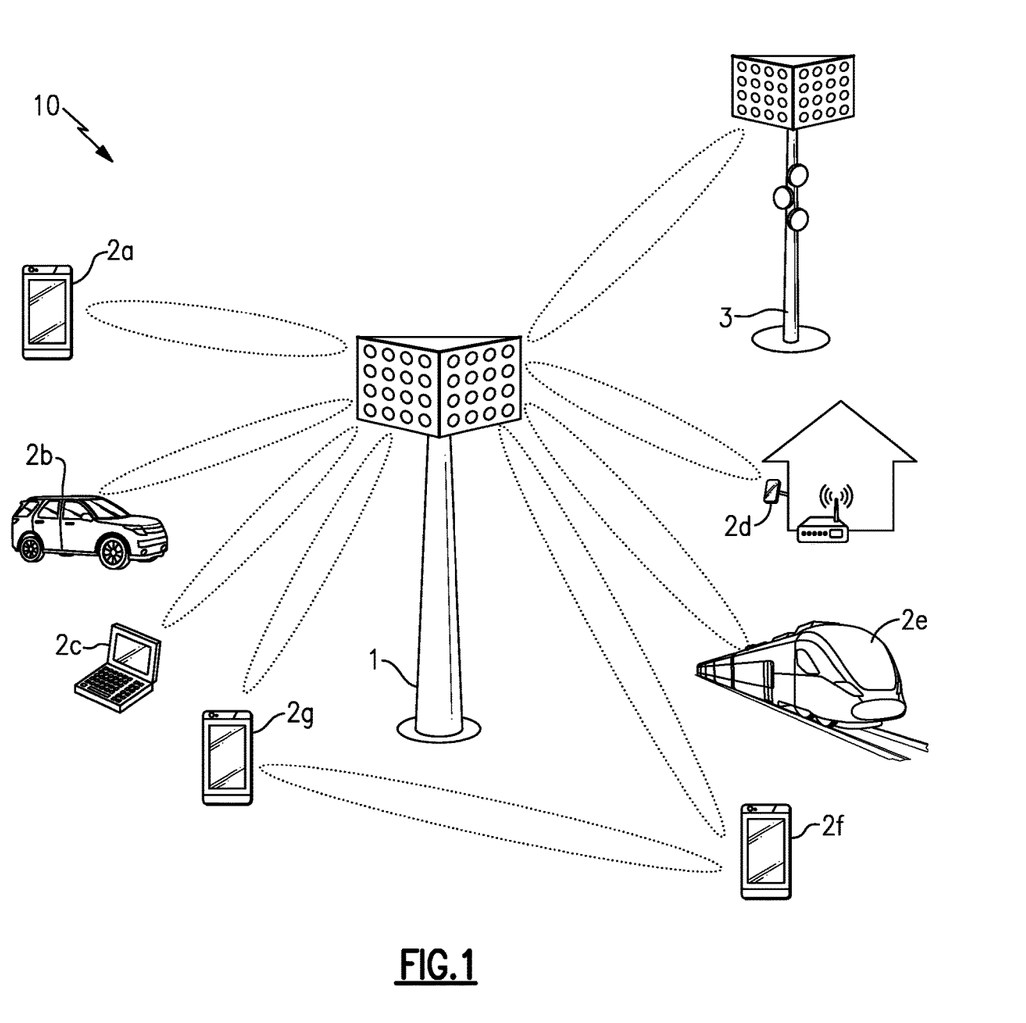
FIG. 1 is a schematic diagram of one example of a communication network.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1) in the range of about 410 MHz to about 7.125 GHz, Frequency Range 2 (FR2) in the range of about 24.250 GHz to about 52.600 GHz, or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
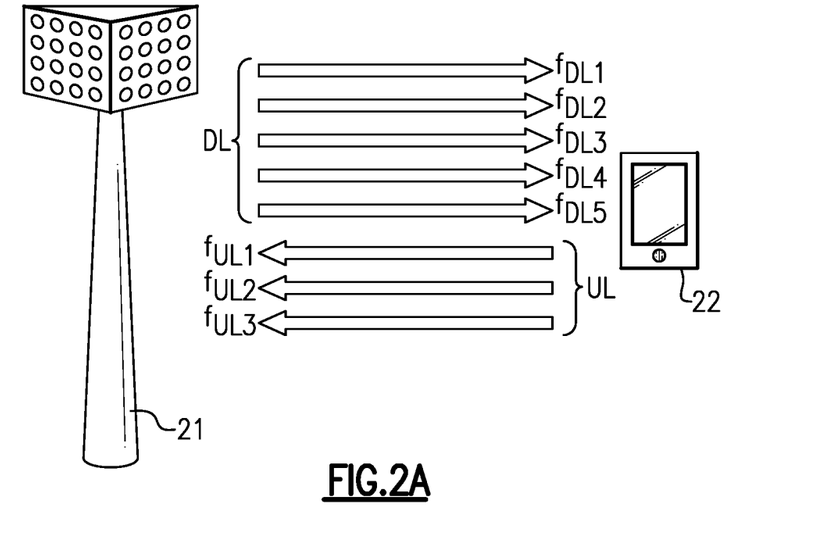
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
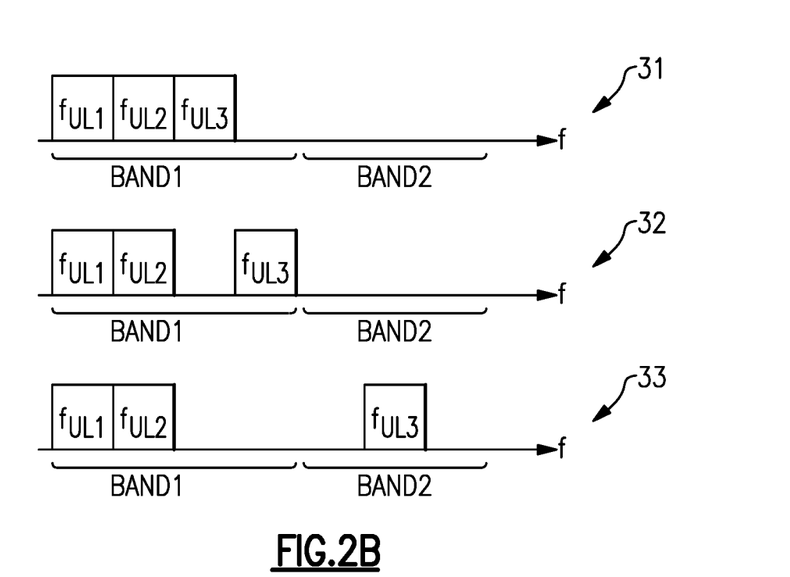
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL}3$ of a second frequency band BAND2.

Figure 2C:
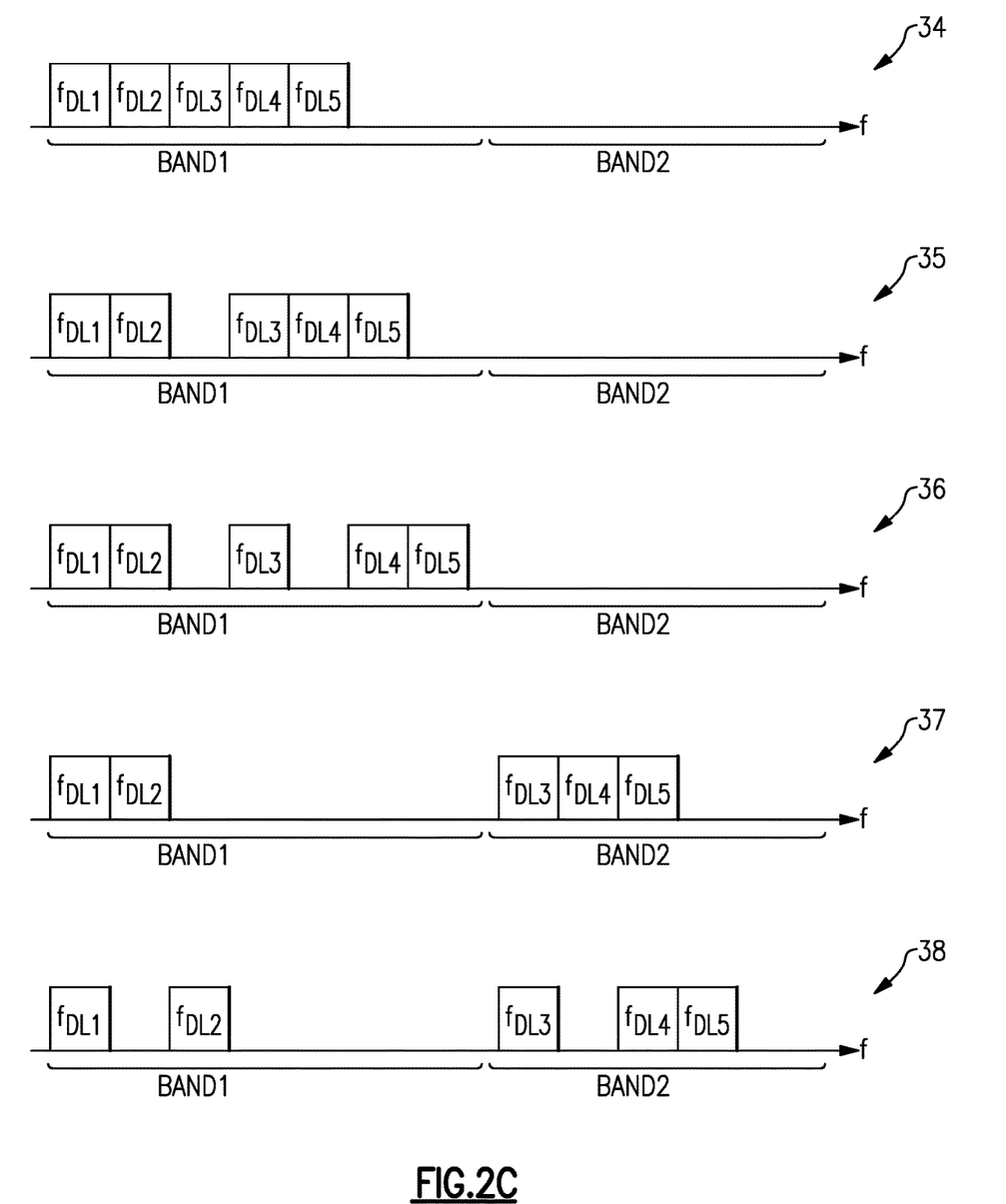
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3:
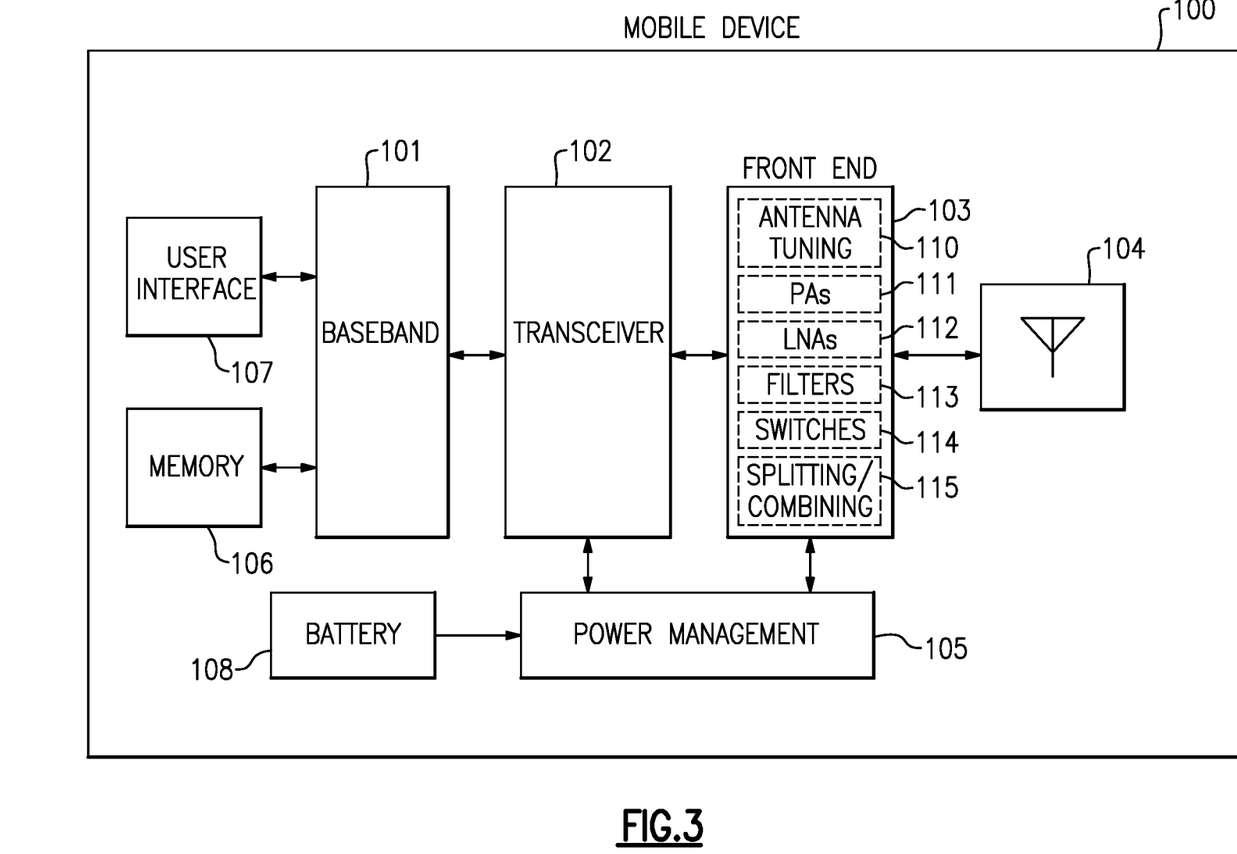
FIG. 3 is a schematic diagram of one embodiment of a mobile device.

FIG. 3 is a schematic diagram of one embodiment of a mobile device 100. The mobile device 100 includes a baseband system 101, a transceiver 102, a front end system 103, antennas 104, a power management system 105, a memory 106, a user interface 107, and a battery 108.

The mobile device 100 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 102 generates RF signals for transmission and processes incoming RF signals received from the antennas 104. It will be understood that various functionalities associated with the transmission and receiving of RF signals can be achieved by one or more components that are collectively represented in FIG. 3 as the transceiver 102. In one example, separate components (for instance, separate circuits or dies) can be provided for handling certain types of RF signals.

The front end system 103 aids in conditioning signals transmitted to and/or received from the antennas 104. In the illustrated embodiment, the front end system 103 includes antenna tuning circuitry 110, power amplifiers (PAs) 111, low noise amplifiers (LNAs) 112, filters 113, switches 114, and signal splitting/combining circuitry 115. However, other implementations are possible.

For example, the front end system 103 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 100 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 104 can include antennas used for a wide variety of types of communications. For example, the antennas 104 can include antennas for transmitting and/or receiving signals associated with a wide variety of frequencies and communications standards.

In certain implementations, the antennas 104 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 100 can operate with beamforming in certain implementations. For example, the front end system 103 can include amplifiers having controllable gain and phase shifters having controllable phase to provide beam formation and directivity for transmission and/or reception of signals using the antennas 104. For example, in the context of signal transmission, the amplitude and phases of the transmit signals provided to the antennas 104 are controlled such that radiated signals from the antennas 104 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 104 from a particular direction. In certain implementations, the antennas 104 include one or more arrays of antenna elements to enhance beamforming.

The baseband system 101 is coupled to the user interface 107 to facilitate processing of various user input and output (I/O), such as voice and data. The baseband system 101 provides the transceiver 102 with digital representations of transmit signals, which the transceiver 102 processes to generate RF signals for transmission. The baseband system 101 also processes digital representations of received signals provided by the transceiver 102. As shown in FIG. 3, the baseband system 101 is coupled to the memory 106 of facilitate operation of the mobile device 100.

The memory 106 can be used for a wide variety of purposes, such as storing data and/or instructions to facilitate the operation of the mobile device 100 and/or to provide storage of user information.

The power management system 105 provides a number of power management functions of the mobile device 100. In certain implementations, the power management system 105 includes a PA supply control circuit that controls the supply voltages of the power amplifiers 111. For example, the power management system 105 can be configured to change the supply voltage(s) provided to one or more of the power amplifiers 111 to improve efficiency, such as power added efficiency (PAE).

As shown in FIG. 3, the power management system 105 receives a battery voltage from the battery 108. The battery 108 can be any suitable battery for use in the mobile device 100, including, for example, a lithium-ion battery.

Diplexer/Multiplexer For Carrier Aggregation

Proliferation of frequency bands and carrier aggregation combinations in RF front ends (RFFEs) has been driving higher costs to support features. It is desirable to reduce internal MCM/SMT content as well the number of includes active devices, in order to contain costs to meet desired or specified costs.

In certain implementations, filters involved in carrier aggregation band combinations are commonly diplexed/multiplexed. This also typically involves resolving the receive path for each band separately into distinct low noise amplifiers (LNAs). This has traditionally been necessary as the two or more bands in carrier aggregation need to operate independently, with separate and full range of gain control for each band, due to the cellular radio environment in which the bands are deployed.

According to aspects of this disclosure two or more band filters are diplexed/multiplexed, but are recombined to implement a dual-passband filter (1-in/1-out). The resulting receive path includes a single gain-stage, with common matching elements. The output current is generated via separate current-buffers/cascades with separate resonant loads and design that allows independent current/gain control in each band path. Single-band operation is largely unchanged compared to other implementations, except for some parasitic loading due to the inclusion of additional active devices.

Figure 4:
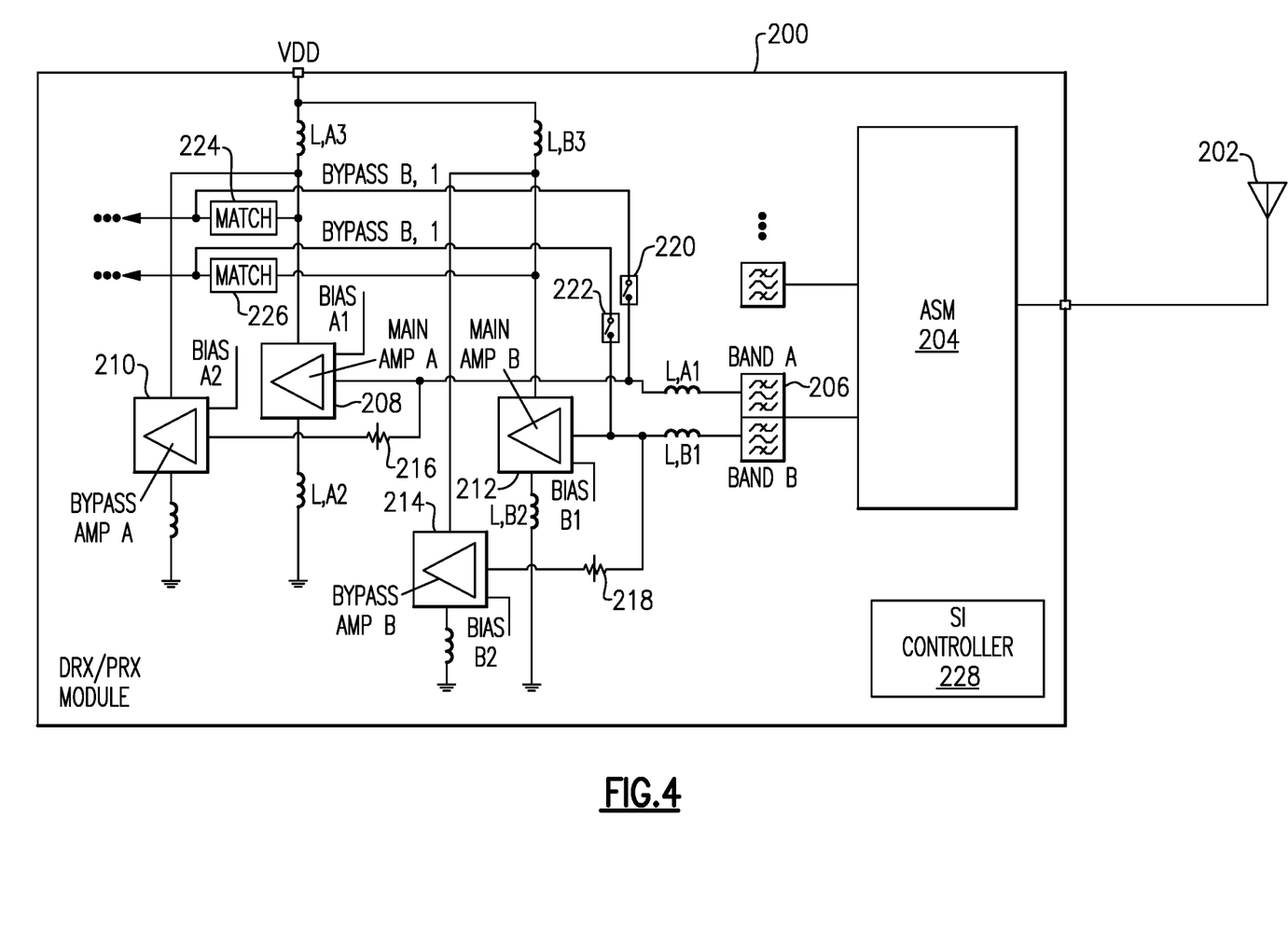
FIG. 4 is an example circuit diagram illustrating a diplexer module configured to be connected to an antenna for use in an RF front end.

FIG. 4 is an example circuit diagram illustrating a diplexer module 200 configured to be connected to an antenna 202 for use in an RF front end. Although the diplexer module 200 is described as a diplexer herein, aspects of this disclosure can also be applied to a multiplexer module 200 when implementing carrier aggregation for three or more bands.

As shown in FIG. 4, the diplexer module 200 includes an antenna switch module (ASM) 204, a diplexer 206, a first main amplifier 208, a first bypass amplifier 210, a second main amplifier 212, a second bypass amplifier 214, a first attenuator 216, a second attenuator 218, a first switch 220, a second switch 222, a first matching circuit 224, a second matching circuit 226, a plurality of first inductors L,A1, L,A2, and L,A3, and a plurality of second inductors L,B1, L,B2, and L,B3. Each of the first and second main amplifiers 208 and 212 and the first and second bypass amplifiers 210 and 214 may be low noise amplifiers configured to amplify RF signals received at the antenna 202. The diplexer module 200 may further include a silicon (Si) controller 228 configured to control other components of the diplexer module 200, including for example, the first and second switches 220 and 222 and setting the level of various bias voltages including Bias A1, Bias A2, Bias B1, and Bias B2.

The diplexer 206 includes a first band pass filter (BPF) for Band A and a second band pass filter (BPF) for Band B. The diplexed node of the diplexer 206 is connected to the ASM 204, and each of the first and second band pass filters are respectively connected to separate paths within the diplexer module 100 for resolving signals received via the ASM 204. For example, a first LNA path may be formed for Band A including the first main amplifier 208, the first bypass amplifier 210, the first attenuator 216, the first switch 220, the first matching circuit 224, and the first inductors L,A1, L,A2, and L,A3. Similarly, a second LNA path may be formed for Band B including the second main amplifier 212, the second bypass amplifier 214, the second attenuator 218, the second switch 222, the second matching circuit 226, and the second inductors L,B1, L,B2, and L,B3. Each of the first and second paths may further be split into a main path (e.g., from the diplexer 206 to one of the first and second main amplifiers 208 and 212) and a bypass path (e.g., from the diplexer 206 to one of the first and second bypass amplifiers 210 and 214).

Using the illustrated implementation of the diplexer module 200, each of Band A and Band B can be operated with an independent gain and other characteristics. For example, the Si controller 228 may be configured to control the amount of bias (e.g., Bias A1 and Bias B1) applied to each of the first and second main amplifiers 208 and 212 in order to control the gain of the RF signals along the respective first and second main paths.

As illustrated in FIG. 4, each of the first and second paths may include at least three inductors L,A1, L,A2, L,A3, L,B1, L,B2, and L,B3 (which may be formed on die and SMT). These inductors may significantly increase the cost of implementing the diplexer module 200, and thus, in some embodiments, the number of inductors can be reduced in order to bring the cost of production down.

Figure 5:
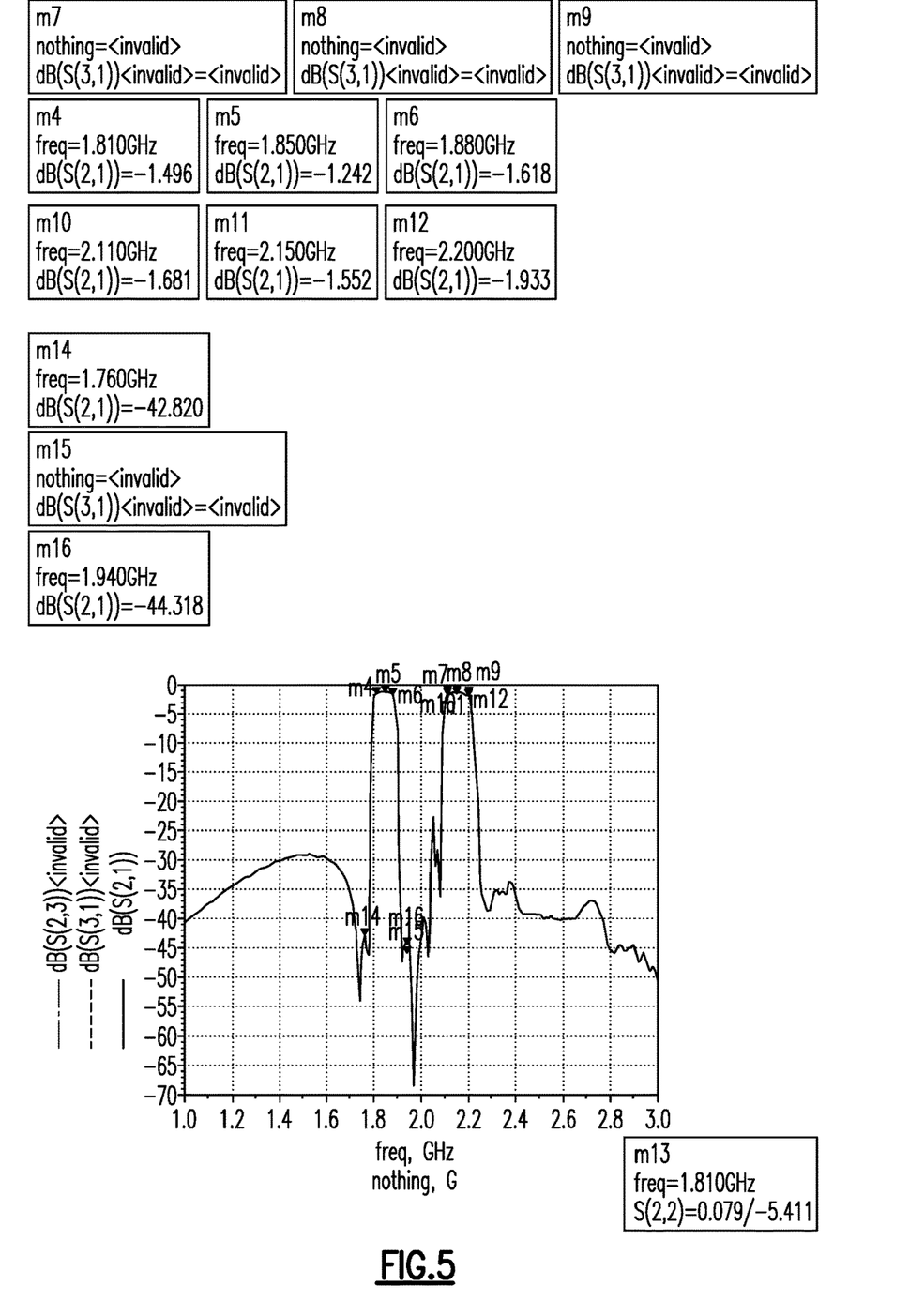
FIG. 5 is an example graph illustrating the frequency response of the diplexer of FIG. 4 according to aspects of this disclosure.

FIG. 5 is an example graph illustrating the frequency response of the diplexer 206 of FIG. 4 according to aspects of this disclosure.

Figure 6:
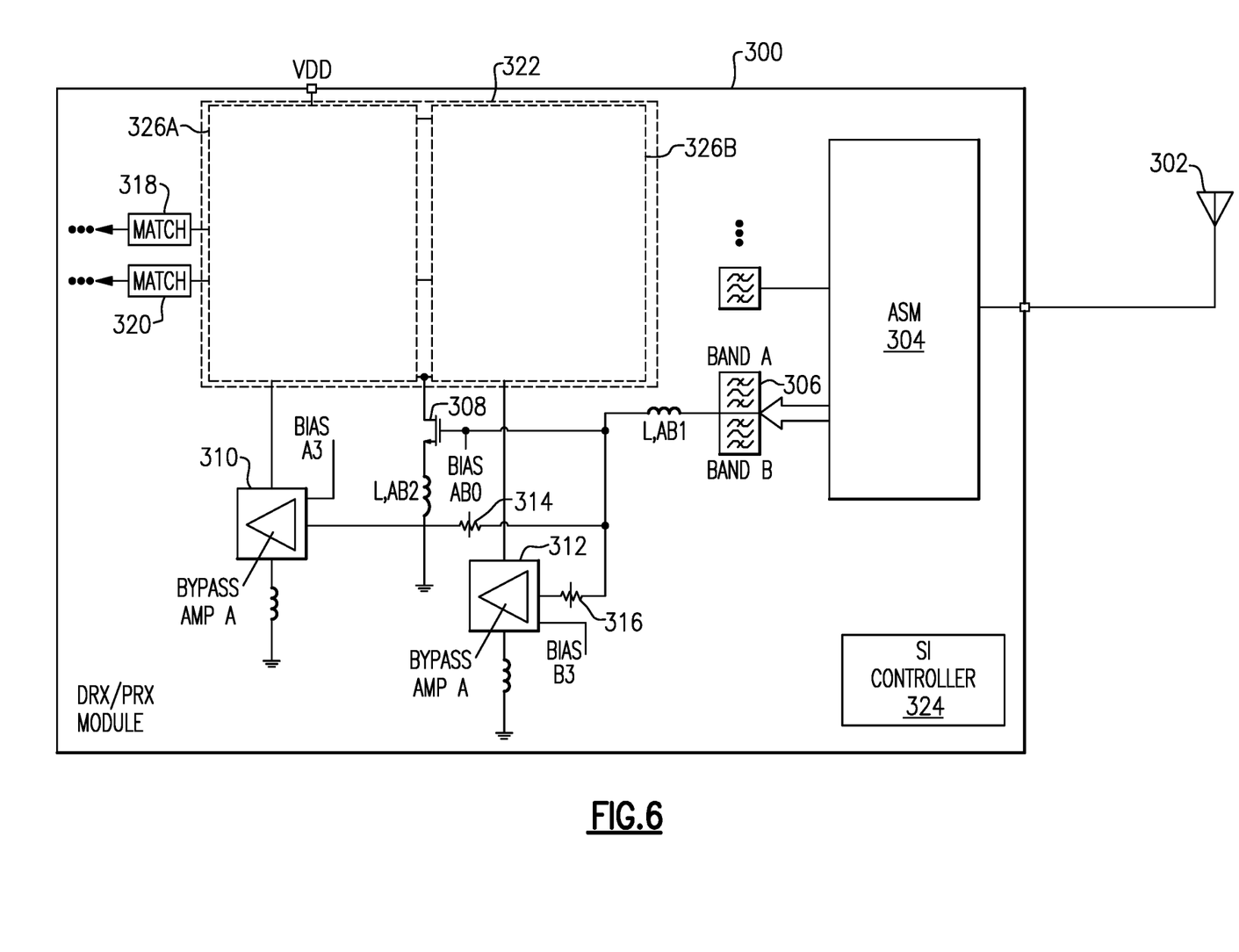
FIG. 6 is an example circuit diagram illustrating a diplexer module configured to be connected to an antenna for use in an RF front end in accordance with aspects of this disclosure.

FIG. 6 is an example circuit diagram illustrating a diplexer module 300 configured to be connected to an antenna 302 for use in an RF front end in accordance with aspects of this disclosure. Although the diplexer module 300 is described as a diplexer herein, aspects of this disclosure can also be applied to a multiplexer module 300 when implementing carrier aggregation for three or more bands. As is described herein, the multiplexer module 300 may include a shared receive path configured to amplify both the first band and the second band. In other words, rather than having independent paths with two LNAs for independently amplifying the Bands A and B, the multiplexer module 300 may have a single shared receive path configured to independently amplify Bands A and B.

As shown in FIG. 6, the diplexer module 300 includes an antenna switch module (ASM) 304, a diplexer 306, a main amplifier 308, a first bypass amplifier 310, a second bypass amplifier 312, a first attenuator 314, a second attenuator 316, a first matching circuit 318, a second matching circuit 320, a plurality of inductors L,AB1 and L,AB2. Each of the main amplifiers 308 and the first and second bypass amplifiers 310 and 312 may be low noise amplifiers configured to amplify RF signals received at the antenna 302. The diplexer module 300 also includes a common transconductance stage 322, which includes two separate common-gate stages 326A and 326B.

Figure 7:
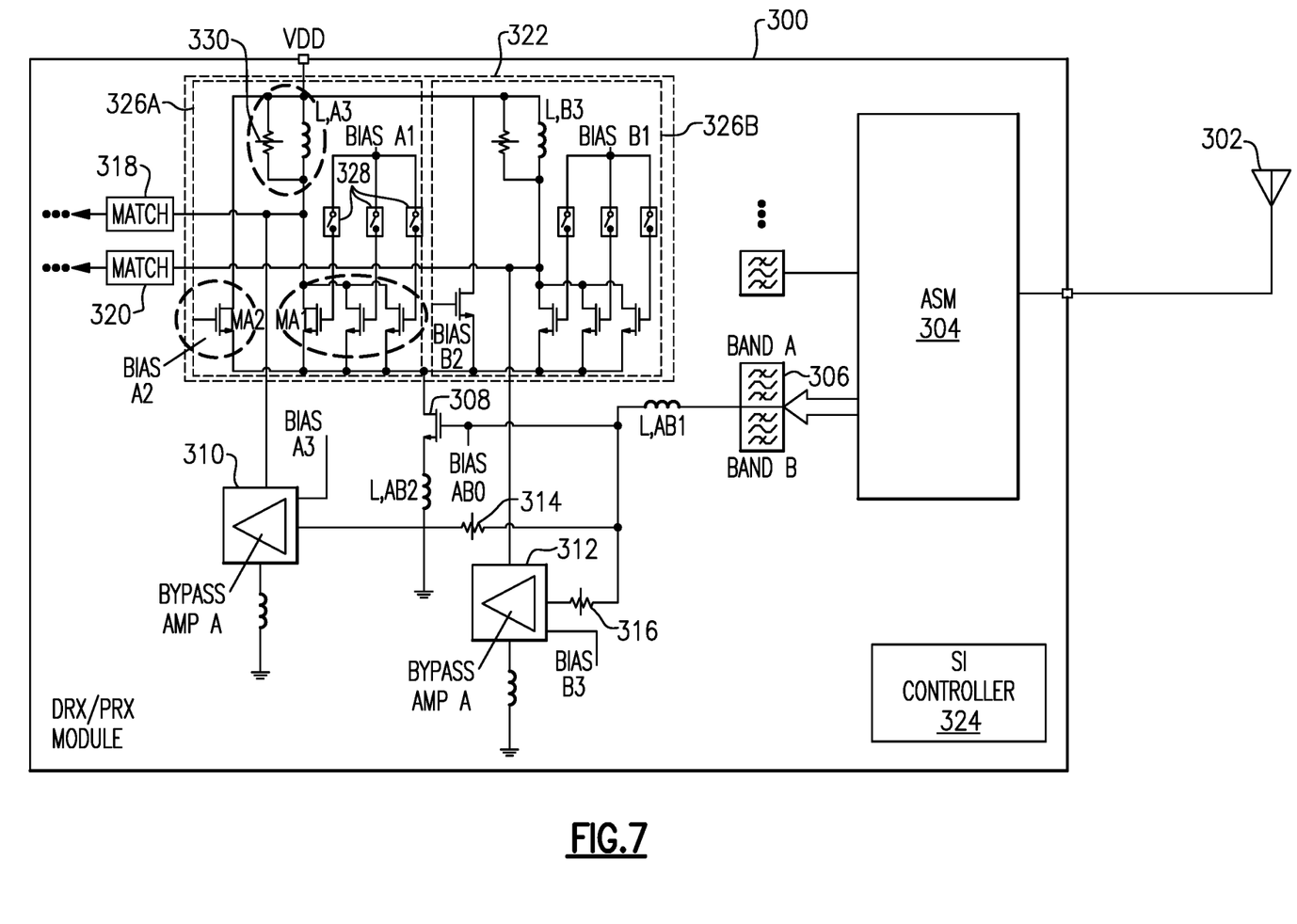
FIG. 7 is another example circuit diagram illustrating a diplexer module configured to be connected to an antenna for use in an RF front end in accordance with aspects of this disclosure.

FIG. 7 is another example circuit diagram illustrating a diplexer module 300 configured to be connected to an antenna 302 for use in an RF front end in accordance with aspects of this disclosure. FIG. 7 illustrates an embodiment of the diplexer module 300 of FIG. 6.

Although the diplexer module 300 is described as a diplexer herein, aspects of this disclosure can also be applied to a multiplexer module 300 when implementing carrier aggregation for three or more bands. As is described herein, the multiplexer module 300 may include a shared receive path configured to amplify both the first band and the second band. In other words, rather than having independent paths with two LNAs for independently amplifying the Bands A and B, the multiplexer module 300 may have a single shared receive path configured to independently amplify Bands A and B.

As shown in FIG. 7, the diplexer module 300 includes an antenna switch module (ASM) 304, a diplexer 306, a main amplifier 308, a first bypass amplifier 310, a second bypass amplifier 312, a first attenuator 314, a second attenuator 316, a first matching circuit 318, a second matching circuit 320, a plurality of inductors L,AB1, L,AB2, L,A3, and L,B3. Each of the main amplifiers 308 and the first and second bypass amplifiers 310 and 312 may be low noise amplifiers configured to amplify RF signals received at the antenna 302. The diplexer module 300 also includes a common transconductance stage 322.

The diplexer module 300 may further include a silicon (Si) controller 324 configured to control other components of the diplexer module 300, including for example, the switches 328 and setting the level of various bias voltages including Bias AB0, Bias A1, Bias A2, Bias A3, Bias B1, Bias B2, and Bias B3.

The diplexer 306 includes a first band pass filter for Band A and a second band pass filter for Band B. In some embodiments, the diplexed node of the diplexer 306 is connected to the ASM 304. In contrast to the embodiment of FIG. 4, diplexed node of the diplexer 306 in the implementations of FIGS. 6 and 7 is also connected to the main amplifier 308, for example, via the inductor L,AB1.

In certain implementations, the main amplifier 308 may be a split-LNA and may be coupled with the common transconductance stage 322. Thus, the main amplifier 308 can be implemented using a single input inductor L,AB1 and a single degeneration inductor L,AB2. If the diplexed bands are relatively close in frequency (as is common), the s11 (e.g., the reflection coefficient or return loss) tradeoff may be acceptable.

The common transconductance stage 322 may include two separate common-gate stages 326A and 326B. Each of the common-gate stages 326A and 326B includes a choke-based resonant circuit tuned for its respective band frequencies (e.g., Band A or Band B). Thus, the common-gate stages 326A and 326B together with the main amplifier 308 may each implement a cascode for each of Band A and Band B. As used herein, a first cascade may refer to the first common-gate stage 326A together with the main amplifier 308, while a second cascade may refer to the first common-gate stage 326B together with the main amplifier 308.

Each of the cascodes is configured to adjust a current provided by the corresponding cascode for the same bias AB0 level provided to the main amplifier 308. Since the two cascodes may have similar components and functionality, the following description will refer to the first cascade, and may also apply to the component and functionality of the second cascade.

The first cascode includes a plurality of parallel devices MA1, a plurality of switches 328, a dummy device MA2, an inductor L,A3, and an attenuator 330. The second cascode has substantially similar components as the first cascode.

The parallel devices MA1 are configured to adjust the effective size of the first cascode. In the illustrated embodiments, the parallel devices MA1 may be implemented as transistors. The parallel devices MA1 are controllable independent of the parallel devices of the second cascode, providing independent control for both Band A and Band B. For example, the switches 328 may be configured to selectively connect the gates of the parallel devices MA1 to a bias A1.

The dummy device MA2 is configured to dump or reduce current applied to the main amplifier 308 and reduce current in the load. The dummy device MA2 is also controllable independent of the dummy device in the second cascode, for example, via the bias A2.

The inductor L,A3 (or other impedance element) is coupled between a power high supply voltage $V_{DD}$ and the drains of each of the parallel devices MA1. The attenuator 330 (or other component configured to provide a variable shunt resistance) is coupled in parallel to the inductor L,A3 and is configured to shunt resistance across the inductor L,A3. Although FIG. 7 illustrates an inductor L,A3, depending on the implementation other impedance elements can be used in place of the inductor L,A3. Similarly, in different implementations the attenuator 300 can be replaced with a different component configured to provide a variable shunt resistance, such as the drain-source on resistance ($R_{DS}$) of a field effect transistor (FET).

The first cascode is able to modify the active gain of Band A independently of the gain of Band B using the parallel devices MA1, the dummy device MA2, and the inductor L,A3 together with the attenuator 330. The independent control of the gain for Bands A and B is one functionality that enables carrier aggregation. For example, this independent control is used when Bands A and B include different serving cells and which may be transmitted from different eNodeB/remote radio head (RRH). In addition, even if Bands A and B are transmitted from the same eNodeB, these bands may operate in different modulation and coding schemes (MCS) and require different gain modes in the main amplifier 308.

In the implementation of FIG. 7, there may be at least two fewer inductors included in the diplexer module 300 compared to the diplexer module 200 of FIG. 4. For example, inductors L,AB1 and L,AB3 may be shared between both Bands A and B, and thus, these two inductors L,AB1 and L,AB3 do not need to be implemented separately for Bands A and B. This provides a savings in terms of the size of the diplexer module 300 as well as the cost of manufacturing the diplexer module 300. These advantages may come with some compromise in the noise factor (NF).

The diplexer module 300 is also configured to operate in a bypass mode for each of Bands A and B. The bypass mode for the diplexer module 300 may function similarly to the bypass modes of the diplexer module 200 of FIG. 4. Each of Bands A and B are able to operate active bypass independently of the other band. The diplexer module 300 may be design to operate when neither carrier aggregation receive band frequency overlaps with the transmit frequency of the other band.

Figure 8:
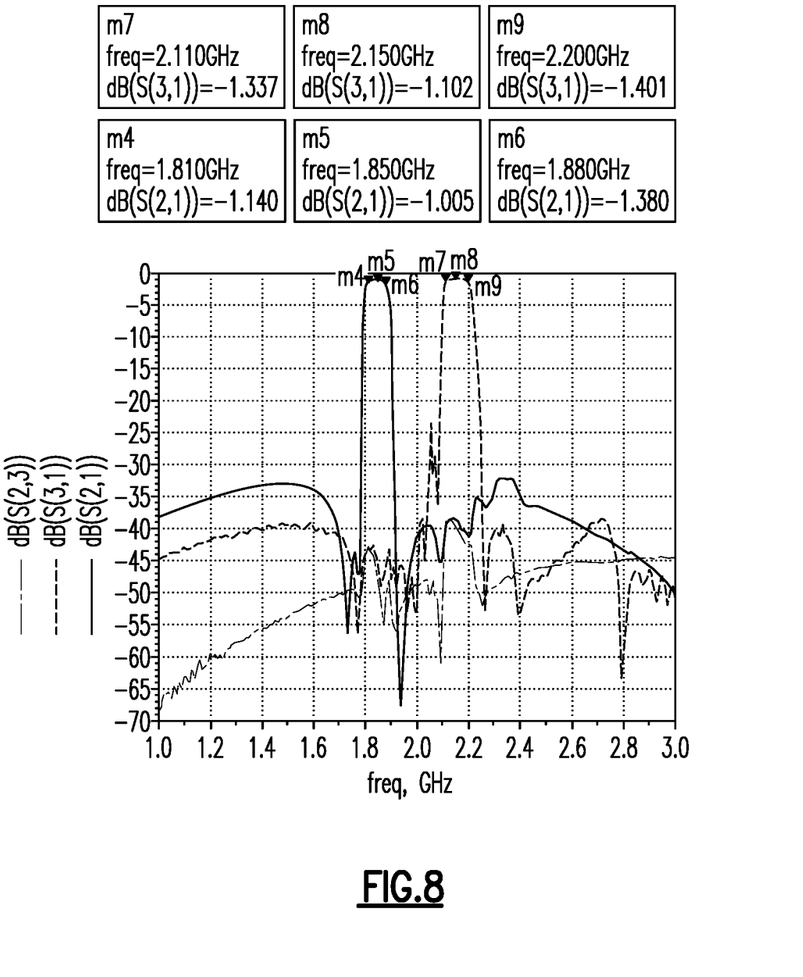
FIG. 8 is an example graph illustrating the frequency response of the diplexer of FIGS. 6 and 7 according to aspects of this disclosure.

FIG. 8 is an example graph illustrating the frequency response of the diplexer 306 of FIGS. 6 and 7 according to aspects of this disclosure.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

While certain embodiments have been described, these embodiments have been presented by way of example only, and are not intended to limit the scope of the disclosure. Indeed, the novel resonators described herein may be embodied in a variety of other forms. Furthermore, various omissions, substitutions and changes in the form of the resonators described herein may be made without departing from the spirit of the disclosure. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A front end for receiving carrier aggregation radio frequency signals, the front end comprising:
    an antenna switch module configured to receive a first radio frequency signal in a first band and a second radio frequency signal in a second band from an antenna;
    a diplexer including a first filter configured to pass the first band, a second filter configured to pass the second band, and a diplexed node between the first and second filters and coupled to the antenna switch module;
    a main amplifier coupled to the diplexed node of the diplexer and configured to amplify radio frequency signals received from the diplexer; and
    a transconductance stage coupled to the main amplifier and configured to independently control the gain of the main amplifier for the first band and the second band.

2. The front end of claim 1 wherein the transconductance stage includes a first common-gate stage configured to control the gain of the main amplifier for the first band and a second common-gate stage configured to control the gain of the main amplifier for the second band.

3. The front end of claim 1 wherein the transconductance stage includes a first common-gate stage and a second common-gate stage, the first common-gate stage and the main amplifier together forming a first cascode, and the second common-gate stage and the main amplifier together forming a second cascode.

4. The front end of claim 3 wherein the first common-gate stage includes a plurality of parallel devices configured to adjust an effective size of the first cascode.

5. The front end of claim 4 wherein each of the parallel device includes a transistor.

6. The front end of claim 3 wherein the first common-gate stage includes a plurality of parallel devices coupled to the main amplifier, and an inductor and an attenuator arrange in parallel between a power high supply voltage and the parallel devices.

7. The front end of claim 1 wherein the transconductance stage together with the main amplifier form a first cascade and a second cascade, the first cascade configured to modify an active gain of the first band independently of an active gain of the second band.

8. The front end of claim 1 further comprising an inductor coupled between the diplexed node of the diplexer and the main amplifier.

9. The front end of claim 1 further comprising a first inductor coupled between the diplexed node of the diplexer and the main amplifier and a second inductor coupled between the main amplifier and a power low supply voltage, the first inductor, the main amplifier and the second inductor form a shared path configured to amplify both the first band and the second band.

10. The front end of claim 1 wherein the transconductance stage includes a dummy device configured to reduce current applied to the main amplifier.

11. The front end of claim 1 further comprising a first bypass amplifier configured to amplify the first band in a bypass mode and a second bypass amplifier configured to amplify the second band in the bypass mode.

12. The front end of claim 11 further comprising a first attenuator coupled between the diplexed node of the diplexer and the first bypass amplifier and a second attenuator coupled between the diplexed node of the diplexer and the second bypass amplifier.

13. A diplexer module for amplifying received radio frequency signals in a first band and a second band, the diplexer module comprising:
    a diplexer including a first filter configured to pass the first band, a second filter configured to pass the second band, and a diplexed node between the first and second filters;
    a main amplifier coupled to the diplexed node of the diplexer and configured to amplify radio frequency signals received from the diplexer; and
    a transconductance stage coupled to the main amplifier and configured to independently control the gain of the main amplifier for the first band and the second band.

14. The diplexer module of claim 13 wherein the transconductance stage includes a first common-gate stage configured to control the gain of the main amplifier for the first band and a second common-gate stage configured to control the gain of the main amplifier for the second band.

15. The diplexer module of claim 13 wherein the transconductance stage includes a first common-gate stage and a second common-gate stage, the first common-gate stage and the main amplifier together forming a first cascode, and the second common-gate stage and the main amplifier together forming a second cascode.

16. The diplexer module of claim 15 wherein the first common-gate stage includes a plurality of parallel devices configured to adjust an effective size of the first cascode.

17. The diplexer module of claim 16 wherein each of the parallel device includes a transistor.

18. The diplexer module of claim 15 wherein the first common-gate stage includes a plurality of parallel devices coupled to the main amplifier, and an inductor and an attenuator arrange in parallel between a power high supply voltage and the parallel devices.

19. The diplexer module of claim 13 wherein the transconductance stage together with the main amplifier form a first cascade and a second cascade, the first cascade configured to modify an active gain of the first band independently of an active gain of the second band.

20. A radio frequency module comprising:
a front end including an antenna switch module configured to receive a first radio frequency signal in a first band and a second radio frequency signal in a second band, a diplexer including a first filter configured to pass the first band, a second filter configured to pass the second band, and a diplexed node between the first and second filters and coupled to the antenna switch module, a main amplifier coupled to the diplexed node of the diplexer and configured to amplify radio frequency signals received from the diplexer, and a transconductance stage coupled to the main amplifier and configured to independently control the gain of the main amplifier for the first band and the second band; and
an antenna coupled to the antenna switch module, the front end and the antenna being enclosed within a common package.

* * * * *